_United States Patent_ [19]

Klosiewicz

[11] Patent Number: 4,664,984
[45] Date of Patent: May 12, 1987

[54] N-ALKYL METHACRYLATE MODIFIED POLYPROPYLENE

[75] Inventor: Daniel W. Klosiewicz, Newark, Del.

[73] Assignee: Hercules Incorporated, Wilmington, Del.

[21] Appl. No.: 847,418

[22] Filed: Apr. 3, 1986

Related U.S. Application Data

[63] Continuation-in-part of Ser. No. 657,443, Oct. 7, 1984, Pat. No. 4,595,726.

[51] Int. Cl.$^4$ .................................. B32B 27/08
[52] U.S. Cl. ................................ 428/516; 156/310; 156/333; 428/518; 428/520
[58] Field of Search ................ 428/518, 520, 516; 525/309, 71; 156/310, 333

[56] References Cited

U.S. PATENT DOCUMENTS 4,447,494 5/1984 Wagner, Jr. ..................... 428/349

_Primary Examiner_—Theodore E. Pertilla
_Attorney, Agent, or Firm_—William S. Alexander

[57] ABSTRACT

Disclosed are graft copolymers of polypropylene containing 3 to 100% by weight based on the weight of the polypropylene backbone, preferably 3 to 30%, of an alkyl methacrylate moiety. These are useful as adhesives for bonding polypropylene to chlorinated hydrocarbon polymers. Laminated structures of polypropylene and chlorinated hydrocarbon polymers, which make use of the aforesaid adhesives, are also disclosed.

3 Claims, No Drawings

4,664,984

N-ALKYL METHACRYLATE MODIFIED POLYPROPYLENE

This application is a continuation-in-part of U.S. Application Ser. No. 657,443, filed Oct. 4, 1984 now U.S. Pat. No. 4,595,726.

This invention relates to a novel modified propylene polymer which is useful as an adhesive layer in polypropylene laminates. More specifically, it relates to graft copolymers of polypropylene and certain alkyl methacrylates which exhibit excellent adhesion both to polypropylene and to chlorinated polymer gas barrier layers when used as an adhesive in polypropylene laminated structures.

BACKGROUND OF THE INVENTION

The polyolefins, and particularly polypropylene (used herein to include propylene homopolymer and copolymers of propylene with up to about 15% of a second alpha-olefin of 2 to 4 carbon atoms), have a number of properties which make them highly desirable as packaging materials. For example, they are inexpensive and tough, have good surface properties, are readily drawn abnd shaped, are inert to most chemical materials and can be employed in food packaging applications. Polypropylene is, however, subject to the very serious objection that it is highly permeable to oxygen and other gases which can be harmful to food products. To overcome this objection for many applications, the polypropylene is laminated with another polymer which has better gas permeability characteristics.

Chlorinated hydrocarbon polymers such as polyvinyl chloride, poly(vinylidene chloride), and copolymers of the preceeding, have been found to be excellent gas barrier materials. It has been proposed to employ a layer of one of these materials as an interlayer between layers of the polypropylene to enhance the gas barrier properties of the composite structure. A layer of a film-forming saponified ethylene—vinyl acetate copolymer has also been found to be useful for this purpose.

Due to significant differences in polarity between polypropylene and the materials which function most satisfactorily as gas barriers, polypropylene does not adhere well to the barrier film, so it is necessary to employ an adhesive layer between the polypropylene and the barrier layer in order to preserve the desired laminar structure. A number of materials have been suggested for this purpose. The most popular appears to be an ethylene—vinyl acetate copolymer.

It is the object of this invention to provide alternative materials which function as well or better than the materials presently known for use as the aforesaid adhesive layer.

It is a further object to provide a modified propylene polymer which exhibits excellent adhesion to both polypropylene and chlorinated hydrocarbon polymers.

It is another object to provide laminar polypropylene structures exhibiting favorable gas permeability characteristics for use as food containers and the like.

THE INVENTION

In accordance with this invention, there is provided a novel propylene polymer comprising polypropylene having grafted thereto an alkyl methacrylate moiety wherein (a) the alkyl methacrylate moiety is present in the amount of about 3 to 100% by weight based on weight of polypropylene; and (b) said alkyl portion has the general formula —CH$_2$—R and R is a 1 to 5 carbon alkyl residue.

In accordance with another aspect of the invention there is provided a polypropylene laminate comprising at least one polypropylene layer and at least one chlorinated hydrocarbon polymer layer and having between each polypropylene layer and each chlorinated hydrocarbon polymer layer, a layer of the novel graft copolymer hereinabove described. Such a laminate is prepared as a film or sheet and can be employed as such or it can be converted, as by thermoforming, into a shaped article such as a container having desirable moisture vapor and oxygen barrier characteristics.

THE ART

U.S. Pat. No. 3,008,920, issued Nov. 14, 1961, teaches the preparation of graft copolymers of polyethylene and acrylonitrile. In the disclosures of this patent, butyl methacrylate is included in a long list of vinyl monomers which are alleged to be graftable. Polypropylene is included in a long list of materials which are alleged to be equivalents of polyethylene in grafting reactions.

U.S. Pat. No. 3,102,050, issued Aug. 27, 1963, teaches a method of applying a polymer coating to a particulate 1-olefin polymer by coating the surface of the particles with a liquid vinyl monomer and polymerizing the same in situ. The conditions of the reaction are said to be such that substantially no grafting takes place.

U.S. Pat. No. 3,188,165, issued June 8, 1965, teaches grafting of organic compounds to the surface of film or fiber forming polymer materials. It is alleged that any organic compound can be employed as the grafting modifier. Polypropylene is exemplified only with acrylonitrile.

French patent No. 1,420,772, issued Nov. 2, 1965, teaches grafting certain free radical polymerizable monomers onto polypropylene backbones. Butyl methacrylate is listed as a usable monomer. Polypropylene is listed as a usable polyolefin, being exemplified only with vinyl pryidine and vinyl acetate.

European patent application publication number 001 313 teaches preparation of graft copolymers free of loose homopolymer. Butyl methacrylate is named as one of a long list of possible polar grafting monomers.

DETAILED DESCRIPTION OF THE INVENTION

The laminated structures of this invention are comprised of at least three layers, namely a polypropylene layer, an adhesive layer and a gas barrier layer. Preferably, they comprise at least five layers, including a second adhesive layer and a second polypropylene layer. In some cases additional layers can be present. In particular such structures may contain a layer in which scrap material from the molding operations is recycled as a separate layer intermediate between the polypropylene and the adhesive layer.

As the polypropylene layer it is preferred to use a homopolymer of propylene having a molecular weight within the film forming range, i.e., having an intrinsic viscosity of about 2 to 5. However, the term "polypropylene" is used in a broad sense to include crystalline copolymers containing up to about 15% ethylene or 1-olefin of 4 to 6 carbon atoms. High or low density polyethylene can be employed as a substitute for polypropylene, but these are generally not favored for use in molded containers as the polyethylenes do not have the favored surface gloss and toughness of polypropylene.

The gas barrier layer is preferably comprised of a film forming chlorinated hydrocarbon polymer. This can be either a homopolymer of a chlorinated hydrocarbon, e.g., poly-(vinylidene) chloride or poly(vinyl chloride) or a copolymer of various other vinyl monomers with vinylidene chloride in appropriate mole ratios. Preferred are the vinyl chloride—vinylidene chloride copolymers.

Chlorine-containing polymers of the specified class impart to the laminates of the invention a very high resistance to premeation by oxygen and carbon dioxide, among other things. These polymers also undergo molecular orientation on drawing within the same approximate temperature range as does polypropylene, thus they do not detract from the favorable physical properties, i.e., tensile strength, stiffness and the like, exhibited by polypropylene.

The significant novelty of the invention, however, resides in the polypropylene—alkyl methacrylate graft copolymer which is employed as the adhesive interlayer between the surface layer and the chlorinated hydrocarbon polymer barrier layer. Although a number of graft copolymers of polypropylene and ethylenically unsaturated materials are known, graft copolymers including alkyl methacrylates as the grafting monomer, have not heretofore been expressly described. Specifically, the graft copolymers described in this invention comprise a polypropylene backbone having grafted thereon an alkyl methacrylate moiety, wherein the alkyl radical has the general formula —$CH_2$—R and R is a 1 to 5 carbon alkyl residue, in an amount equal to 3 to 100%, preferably 3 to 30% by weight, based on the weight of the polypropylene backbone.

To prepare the novel graft copolymers of the invention, a relatively standard grafting technique is employed, but reaction conditions are maintained within a closely defined narrow range which results in the appropriate graft add-on level and most effective distribution of the polar functionality.

The graft copolymers are prepared at a temperature below the softening point of polypropylene via a solvent free, vapor phase reaction in the presence of a free radical forming catalyst. Reaction conditions appear to be important for getting optimum adhesive qualities in the resultant copolymer.

The optimal amount of graft attached to the polymer chain is about 10 to 20 wt. % based on the weight of polypropylene. However, it appears to be desirable, for optimum adhesion, that there be a specific, critical distribution of the grafted units on the polypropylene backbone. This specific distribution is attained by close monitoring of relationships between specific reaction parameters. Thus, it is found that graft copolymers which adhere best to chlorinated hydrocarbon polymers are prepared when the mole ratio of alkyl methacrylate to graft initiator is within the range of about 10/1 to 30/1 during the reaction.

It is theorized that maintenance of the relationships among the parameters which control graft chain initiation, growth and termination has a beneficial effect on adhesion by virtue of its effect on the chain length of the grafted alkyl methacrylate moieties. Thus, a low ratio of alkyl methacrylate compound to catalyst leads to formation of a relatively large number of poly(alkyl methacrylate) chains of relatively short length. On the other end of the scale, a high ratio leads to formation of relatively long poly(alkyl methacrylate) chains, but relatively few of them. For the best adhesion, there appears to be a minimum chain length whereby the grafted chains are long enough to become entangled with the chlorinated hydrocarbon polymer, as well as a minimum number of such chains to have sufficient adhering contact points between the polymer layers in the film or sheet. Thus, outside of the specified range of alkyl methacrylate-to-initiator ratios where one of these conditions is not satisfied, adhesion will result but is frequently less than optimum.

The best distribution of the alkyl methacrylate grafts on the polypropylene backbone and the highest degree of uniformity of the graft chain lengths are effected if the formation of active grafting sites on the polypropylene backbone is coordinated with the introduction of the alkyl methacrylate monomer into the reaction environment. This is accomplished by adding the alkyl methacrylate monomer over a time period corresponding to about 1 to 2 half lives of the peroxide initiator. The peroxide is added to the polypropylene at the reaction temperature immediately prior to the start of the monomer addition.

The half-life of decomposition depends on the stability of the peroxide and the reaction temperature. Thus, the rate of initiator decomposition can be varied by either the choice of peroxide or the reaction temperature. By half-life is meant the time period during which the peroxide composition will decrease by 50% due to decomposition. By way of example, it is reported that the half-life of t-butyl perbenzoate at 135° C. is 15 minutes. Thus, under these conditions, the monomer should be uniformly added over a 15 to 30 minute charge period. A monomer addition period of 15 to 60 minutes is considered optimal and the peroxide half-life should be compatible with the choice of the addition time.

The reaction can be carried out with any of the known free radical initiators as a catalyst. These include, by way of example t-butyl perbenzoate, t-butyl peroxytoluate, OO-t-butyl O-isopropyl monoperoxy carbonate, OO-t-butyl O-2-ethylhexyl monoperoxy carbonate, or 2,4Dimethyl [2,4Di-t-butyl peroxy] hexane; t-butyl perbenzoate is a preferred initiator.

The following examples demonstrate the preparation of the polypropylene—alkyl methacrylate graft copolymer.

EXAMPLE 1

To a 2 liter heated reactor equipped with a high speed blade agitator is charged 100 parts by weight of propylene homopolymer (Pro-fax 6501 from HIMONT Incorporated). The reactor is purged and blanketed with nitrogen and the temperature within the reactor is raised to about 135° C. When the temperature is stabilized, and with the agitator running, one (1) part by weight of t-butyl perbenzoate is sprayed in. After several minutes agitation time to allow complete dispersal of the perbenzoate, 20 parts of n-butyl methacrylate is sprayed in over about a fifteen minute time period. After an additional 60 minutes, the reactor is evacuated at 75 mm Hg for about 50 minutes to remove any residual n-butyl methacrylate, returned to atmospheric pressure and allowed to cool to room temperature. The grafted product is removed from the reactor in the original physical form of the polypropylene.

Approximately 115 parts of product are removed from the reactor following the evacuation and cooling.

Extraction of a sample of this material with toluene and acetone recovers only trace amounts of extractables indicating that the n-butyl methacrylate is chemically bonded to the polypropylene backbone. The gain in weight of product over starting polypropylene indicates that about 15% n-butyl methacrylate has added on to the polymer chain.

EXAMPLES 2 and 3

The procedure of Example 1 is repeated using 10 parts (Example 2) and 17 parts (Example 3) of n-butyl methacrylate. Otherwise the procedure is similar.

Extraction of the product indicates that the graft efficiency was high in both cases.

EXAMPLES 4–8

Using the techniques of Example 1, a series of graft copolymers are prepared as listed in the following table.

| Example # | Grafted Compound | % Graft Level |
|---|---|---|
| 4 | ethyl Methacrylate | 14% |
| 5 | isobutyl Methacrylate | 14% |
| 6 | n-pentyl Methacrylate | 25% |
| 7 | n-hexyl Methacrylate | 13% |
| 8 | methyl Methacrylate | 14% |

EXAMPLE 9

Fifty (50) pounds of homopolypropylene (Pro-fax 6501 from HIMONT Incorporated) is charged to a 130 liter reactor equipped with plow blade agitators. The reactor is inerted with $N_2$ and the polypropylene agitated at 190 ppm. After the system is inerted, the reactor and its contents were heated to 140° C. When the polypropylene temperature reaches 135° C., 0.5 lbs. of t-butyl perbenzoate is sprayed onto the flake. Within 10 minutes, the addition of 10 lbs. of n-butyl methacrylate is begun. The monomer is sprayed on the polypropylene and peroxide mixture over a 25 minute addition period. After the monomer addition is completed, the material is reacted out for 15 additional minutes, then vacuum stripped for 1 hour.

The novel alkyl methacrylate graft copolymers of this invention can be employed by themselves as adhesive layers in polypropylene/chlorinated hydrocarbon polymer composites. The presence of the polypropylene backbone promotes compatibility with polypropylene and thus good adhesion to the polypropylene layer. Likewise the presence of the relatively polar carbonyl oxygen in the methacrylate moiety promotes adhesion to the chlorinated hydrocarbon polymer.

However, for economic reasons it is preferred to blend the graft copolymers with polypropylene for use as the adhesive layer. It has been found that dilution of the grafts with polypropylene yields adhesive strengths which are well beyond the commercially required minimum. In general, the blends with polypropylene will contain about 10 to 30% by weight of graft copolymer. It is believed that the relative incompatibility of the polar methacrylate group with polypropylene causes the methacrylate groups to be rejected by the body of the polymer and thus concentrated at the interface between the adhesive layer and the barrier layer, where they are available to contact the chlorinated hydrocarbon layer to which it is intended to promote adhesion.

It has also been noted that the reaction conditions employed in the grafting reaction sometimes lead to degradation of the polypropylene chain so that the extrusion and film forming properties of the grafted product are not as good as might be wanted in a coextrusion operation. Any potential problem on this point is avoided by use of the blend with polypropylene.

Further improvement in the adhesion with the chlorinated hydrocarbon polymer layer can be effected by including an elastomeric or non-crystalline ethylene—propylene copolymer in the formulation. A level up to about 35%, preferably about 30% by weight is optimum. The ethylene—propylene copolymer is one containing about 20 to 80% by weight of ethylene. It can be present as ethylene-propylene rubber (EPR), a commercially available product. It can also be present in the form of in-situ copolymer in which non-crystalline ethylene—propylene copolymer blocks are polymerized in with propylene homopolymer blocks. In this latter instance, the block copolymer can be employed as the sole diluent instead of propylene homopolymer.

In the examples which follow, the good adhesion achievable between polypropylene and chlorinated hydrocarbon polymers by the use of the novel polypropylene graft copolymers of this invention is shown. Adhesion is determined by means of the "T-Peel" adhesion test (ASTM D-1876) in which the bond between the adhesive layer and the adjacent polypropylene and polyvinylidene chloride layer is measured. This is accomplished by clamping the polypropylene side of the laminate in the jaw of an Instron Universal Tester, clamping the polyvinylidene chloride side of the laminate in the opposing jaw, and increasing the jaw separation distance at a rate of 10 inches/minute. The movement may be accomplished by moving one or both jaws in opposite directions. This movement causes the two sides of the laminate to "peel" from each other and the force required to accomplish this movement is recorded as the "T-Peel" value.

EXAMPLE 10

An adhesive blend is prepared by dry-blending varying amounts of the graft copolymers of Examples 1, 2 and 3 with various levels of ethylene—propylene copolymer rubber (EPR) (Royalene 100—low M.W. EPR from Uniroyal) and a block copolymer containing propylene homopolymer blocks and non-crystalline ethylene—propylene copolymer blocks (Pro-fax 8501 from HIMONT Incorporated, Wilmington, Del.). This blend is added to a compounding device at 200° C. and mixed until it is completely melted and substantially uniform. After cooling, a portion of the blend is placed between teflon sheets and the teflon sheets placed between aluminum plates. The plates are preheated for two minutes at 220° C., then pressed at 10 tons force for two minutes to prepare a six (6) mil film. The film is then removed from the press and quenched.

The adhesive films are compression laminated between polypropylene films and polyvinylidene chloride films in a press at 190° to 205° C. at 0.5 to 1 ton force for about 15 or 30 seconds, then quenched in cold water. Pertinent data concerning formulations and their adhesive properties are recorded in Table 2.

TABLE 2

| Graft | % Graft in Blend | % Block Copolymer | % EPR | 30 Second T-Peel Adhesion (lb/in) Avg. | Peak |
|---|---|---|---|---|---|
| Ex 1 | 40.0 | 60 | — | 29.3 | 33.0 |
| Ex 1 | 34.0 | 50 | 16.0 | 25.7 | 28.1 |
| Ex 2 | 40.0 | 60 | — | 16.2 | 20.4 |
| Ex 2 | 34.0 | 50 | 16.0 | 26.7 | 30.7 |
| Ex 3 | 34.0 | 50 | 16.0 | 22.6 | 26.8 |
| Ex 3 | 28.5 | 43 | 28.5 | 19.4 | 25.0 |

EXAMPLE 11

Using the method of Example 10, a series of adhesive resin blends is prepared using graft copolymers of other alkyl methacrylates prepared in Examples 4, 5, 6, 7 and 8. These are laminated to poly(vinylidene chloride) via compression lamination to demonstrate their adhesive properties. Particulars of these tests are recorded in Table 3.

TABLE 3

| Graft | % Graft in Blend | T-Peel Adhesion (lb/in) 15 sec | 30 sec |
|---|---|---|---|
| Ex 4 | 15 | 10 | 20 |
| Ex 4 | 25 | 26 | 27 |
| Ex 5 | 15 | 11 | 22 |
| Ex 5 | 25 | 24 | 24 |
| Ex 6 | 25 | Excellent | |
| Ex 7 | 15 | 5 | 8 |
| Ex 7 | 25 | 9 | 11 |
| Ex 8 | 15 | Poor | Poor |
| Ex 8 | 25 | Poor | Poor |

EXAMPLES 12–15

The graft copolymer described in Example 9 is extrusion compounded into adhesive blends useful for bonding polypropylene to polyvinylidene chloride polymers. These blends consist of mixtures of the graft copolymer with ethylene—propylene rubber (EPR) and crystalline polypropylene copolymers containing various levels of ethylene comonomer. The composition of these blends is listed in Table 4.

TABLE 4

| | % Graft Copolymer | % EPR | % Polypropylene Copolymer |
|---|---|---|---|
| Example 12 | 25% | 10% | 65% Pro-fax 8501 |
| Example 13 | 25% | 10% | 65% Pro-fax 8601 |
| Example 14 | 25% | 20% | 55% Pro-fax 8501 |
| Example 15 | 25% | 30% | 45% (93% C$_3$, 7% C$_2$ Copolymer) |

EXAMPLES 16 AND 17

Films made from the blends identified as Examples 12 and 13 are compression laminated between polypropylene and polyvinylidene chloride (PVDC) polymer layers. Results are presented in Table 5.

TABLE 5

| Example | Adhesive | Adhesion by Lamination (lb/in) |
|---|---|---|
| 16 | Ex 12 | 24.5 |
| 17 | Ex 13 | 25.5 |

EXAMPLES 18–21

Adhesive films are prepared using the formulations described in Examples 12 to 15. These materials are compression laminated to PVDC at 1 ton pressure and 205° C. The same formulations are also coextruded into five-layer shells with two outside polypropylene, two adhesive layers, and a center PVDC layer using a 24 inch wide coextrusion die. The adhesion in both the coextruded sheet and the laminate sheet is measured by the T-Peel test. Results are presented in Table 6. The interlayer adhesion between the polypropylene and PVDC layers achieved via coextrusion is very high, approaching the value achieved by compression lamination.

TABLE 6

| Example | Adhesive | Adhesion by Lamination (lb/in) | Adhesion by Coextrusion (lb/in) |
|---|---|---|---|
| 18 | Ex 12 | 24.5 | 20 |
| 19 | Ex 13 | 33.0 | 23 |
| 20 | Ex 14 | 30.0 | 28 |
| 21 | Ex 15 | 41.2 | 34 |

EXAMPLES 22 AND 23

The adhesives described in Examples 12 and 14 are provided to a major food packager for a coextrusion trial. This 35 mil, 5 layer composite sheet is made for subsequent thermoforming. The resultant sheets are tested for interlayer adhesion, giving the results listed in Table 7. This composite sheet is subsequently thermoformed into shallow food trays. The sheet made using these adhesives displays excellent formability and the final product demonstrates good adhesion between the PVDC and polypropylene layers.

TABLE 7

| Example | Adhesive | Adhesion (lb/in) |
|---|---|---|
| 21 | Ex 12 | 16.0 |
| 22 | Ex 14 | 18.5 |

In many of the applications contemplated for the polypropylene—chlorinated hydrocarbon polymer laminates of this invention, large quantities of scrap are unavoidably formed. To make an economically feasible process, it is necessary that this scrap be recycled and reused. However, the chlorinated hydrocarbon polymer cannot be remelted for recycle with polypropylene as its decomposition temperature is below the melting point of polypropylene. Decomposition of the chlorinated polymer results in charring and undesirable color formation as well as generation of toxid and corrosive hydrogen chloride gas. These characteristics have virtually barred the use of chlorinated hydrocarbon polymers from use in this market.

A useful attribute of the adhesives of this invention is that at temperatures of 100° C. and above, the bond strength between the chlorinated polymer and the adhesive deteriorates to a point where the layers of the laminate can be readily separated by peeling. The chlorinated polymer layer and polypropylene plus adhesive layers can then be recycled individually, each under the conditions which it requires and which it can tolerate.

A similar effect can be achieved by use of certain polar solvents; most notably acetone.

What is claimed is:

1. A laminated structure having at least one polypropylene layer and at least one chlorinated hydrocarbon polymer layer, said layers being adhered by means of an adhesive layer comprising a graft copolymer of polypropylene and an alkyl methacrylate wherein
   (a) the alkyl methacrylate moiety is present in the amount of about 3 to 30% by weight, based on the weight of the polypropylene backbone; and
   (b) the alkyl portion of the alkyl methacrylate moiety has the general formula —$CH_2$—R and R is a 1 to 5 carbon alkyl residue.

2. The laminated structure of claim 1 wherein the polypropylene layer is propylene homopolymer and the chlorinated hydrocarbon polymer layer is poly(vinylidene chloride).

3. A laminated structure comprised of at least one polypropylene layer and at least one poly(vinylidene chloride) layer, said layers being adhered by means of an adhesive layer which is a polymer blend comprised of polypropylene, 0 to 35% of a rubbery ethylene—propylene copolymer and 10 to 30% by weight, based on the total weight of the blend, of a graft copolymer of polypropylene and n-butyl methacrylate wherein the n-butyl methacrylate moiety is present in the amount of 3 to 30% by weight, based on the weight of the polypropylene backbone.

* * * * *